US009076033B1

(12) United States Patent
Barron et al.

(10) Patent No.: US 9,076,033 B1
(45) Date of Patent: Jul. 7, 2015

(54) HAND-TRIGGERED HEAD-MOUNTED PHOTOGRAPHY

(71) Applicant: Google Inc., Mountain View, CA (US)

(72) Inventors: Jonathan Tilton Barron, Oakland, CA (US); Marc Stewart Levoy, Stanford, CA (US); Samuel William Hasinoff, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 187 days.

(21) Appl. No.: 13/630,537

(22) Filed: Sep. 28, 2012

(51) Int. Cl.
*H04N 5/228* (2006.01)
*G06K 9/00* (2006.01)
*G06F 3/00* (2006.01)
*G06F 3/01* (2006.01)
*G06F 3/033* (2013.01)

(52) U.S. Cl.
CPC ............ *G06K 9/00355* (2013.01); *G06F 3/005* (2013.01); *G06F 3/017* (2013.01)

(58) Field of Classification Search
USPC .............................. 348/47, 51, 207.99, 222.1, 348/333.01–333.03; 345/7–9; 715/863
See application file for complete search history.

(56) References Cited

U.S. PATENT DOCUMENTS

| | | | | |
|---|---|---|---|---|
| 7,483,057 | B2 * | 1/2009 | Grosvenor et al. | 348/211.9 |
| 7,721,207 | B2 * | 5/2010 | Nilsson | 715/707 |
| 7,877,707 | B2 * | 1/2011 | Westerman et al. | 715/863 |
| 8,090,254 | B2 * | 1/2012 | Wang | 396/263 |
| 8,558,759 | B1 * | 10/2013 | Prada Gomez et al. | 345/7 |
| 8,723,988 | B2 * | 5/2014 | Thorn | 348/240.99 |
| 2008/0231721 | A1 * | 9/2008 | Chou et al. | 348/222.1 |
| 2009/0109795 | A1 | 4/2009 | Marti | |
| 2010/0053304 | A1 * | 3/2010 | Underkoffler et al. | 348/42 |
| 2010/0199232 | A1 * | 8/2010 | Mistry et al. | 715/863 |
| 2011/0214082 | A1 | 9/2011 | Osterhout et al. | |
| 2011/0221948 | A1 * | 9/2011 | Saito | 348/333.01 |
| 2012/0056992 | A1 * | 3/2012 | Kuroda | 348/46 |
| 2012/0162464 | A1 * | 6/2012 | Kim | 348/223.1 |
| 2014/0078318 | A1 * | 3/2014 | Alameh | 348/207.99 |
| 2014/0225918 | A1 * | 8/2014 | Mittal et al. | 345/633 |

OTHER PUBLICATIONS

DigInfoTV, Ubi-Camera—Take Photos With Your Hands, Mar. 28, 2012, available online at: http://www.diginfo.tv/v/12-0047-r-en.php.
Mistry, Pranav, et al., SixthSense: A Wearable Gestural Interface, MIT Media Laboratory, Dec. 16-19, 2009, Japan.

(Continued)

*Primary Examiner* — Ngoc-Yen Vu
(74) *Attorney, Agent, or Firm* — McDonnell Boehnen Hulbert & Berghoff LLP

(57) ABSTRACT

Embodiments described herein may help a computing device, such as a head-mountable device (HMD), to capture and process images in response to a user placing their hands in, and then withdrawing their hands from, a frame formation. For example, an HMD may analyze image data from a point-of-view camera on the HMD, and detect when a wearer holds their hands in front of their face to frame a subject in the wearer's field of view. Further, the HMD may detect when the wearer withdraws their hands from such a frame formation and responsively capture an image. Further, the HMD may determine a selection area that is being framed, within the wearer's field of view, by the frame formation. The HMD may then process the captured image based on the frame formation, such as by cropping, white-balancing, and/or adjusting exposure.

23 Claims, 15 Drawing Sheets

(56) References Cited

OTHER PUBLICATIONS

Ogaki, Keisuke, et al., Coupling Eye-Motion and Ego-Motion Features for First-Person Activity Recognition, University of Tokyo, Japan.

Joshi, Neel, et al., Personal Photo Enhancement Using Example Images, ACM Transactions on Graphics, Apr. 2010, available online at: http://research.microsoft.com/en-us/um/people/neel/personal_photos/.

Johnson, Joel, Digital Camera Face Recognition: How It Works, Popular Mechanics, Oct. 1, 2009, available online at: http://www.popularmechanics.com/technology/how-to/4218937.

Gesture Recognition, Wikipedia, available online at: http://en.wikipedia.org/wiki/Gesture_recognition.

PictoColor Software, The Best Shortcut to Perfect Color, available online at: http://www.pictocolor.com/icorrect_portrait_memory_color_tutorial.htm.

Flutter, MAC App Store, available online at: http://itunes.apple.com/us/app/flutter/id522248613?mt=12.

Jack Purcher, Apple Mages Working on Augmented Reality Magic, Patently Apple, Dec. 16, 2009, available online at: http://www.patentlyapple.com/patently-apple/2009/12/apple-mages-working-on-augmented-reality-magic.html.

\* cited by examiner

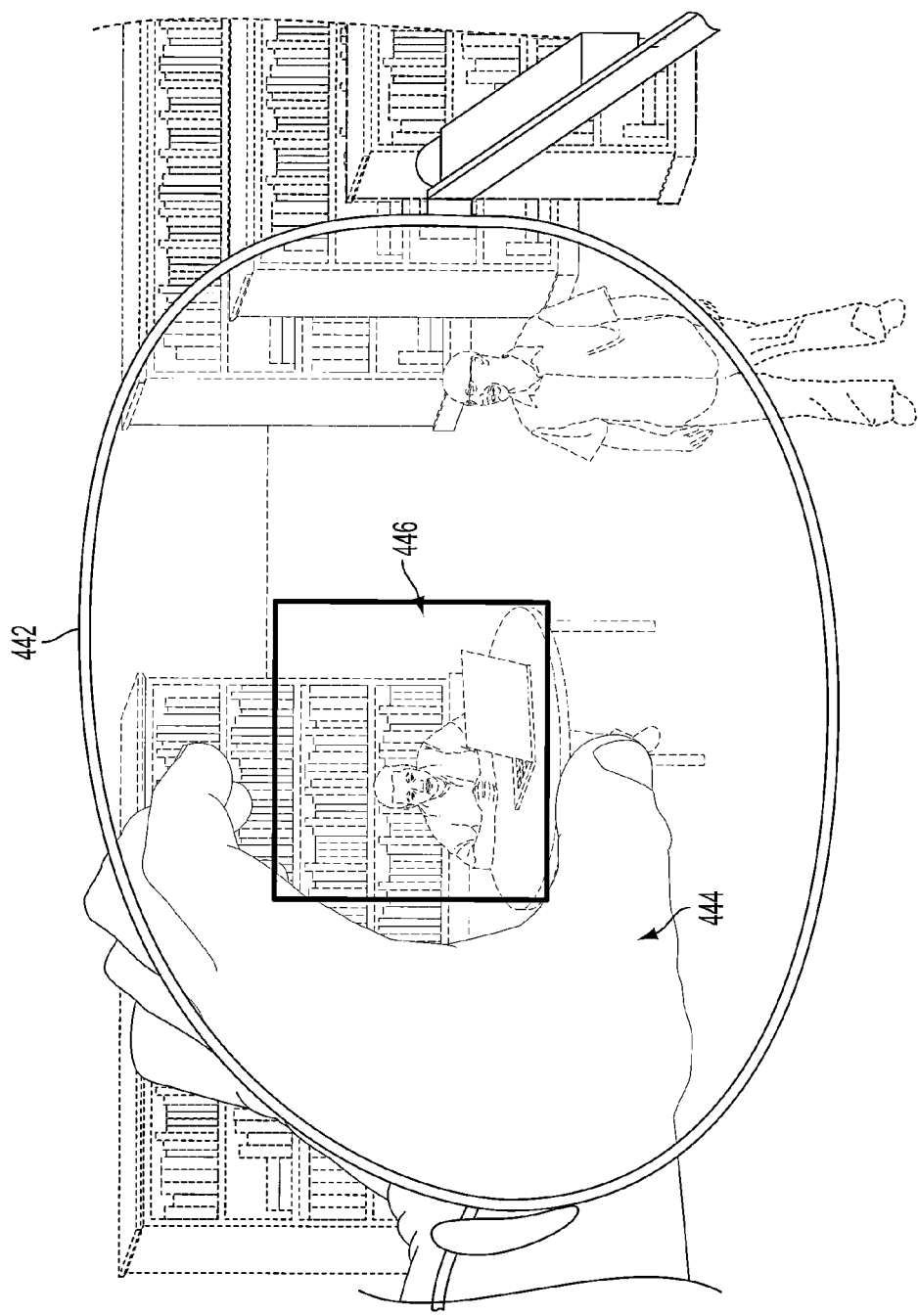

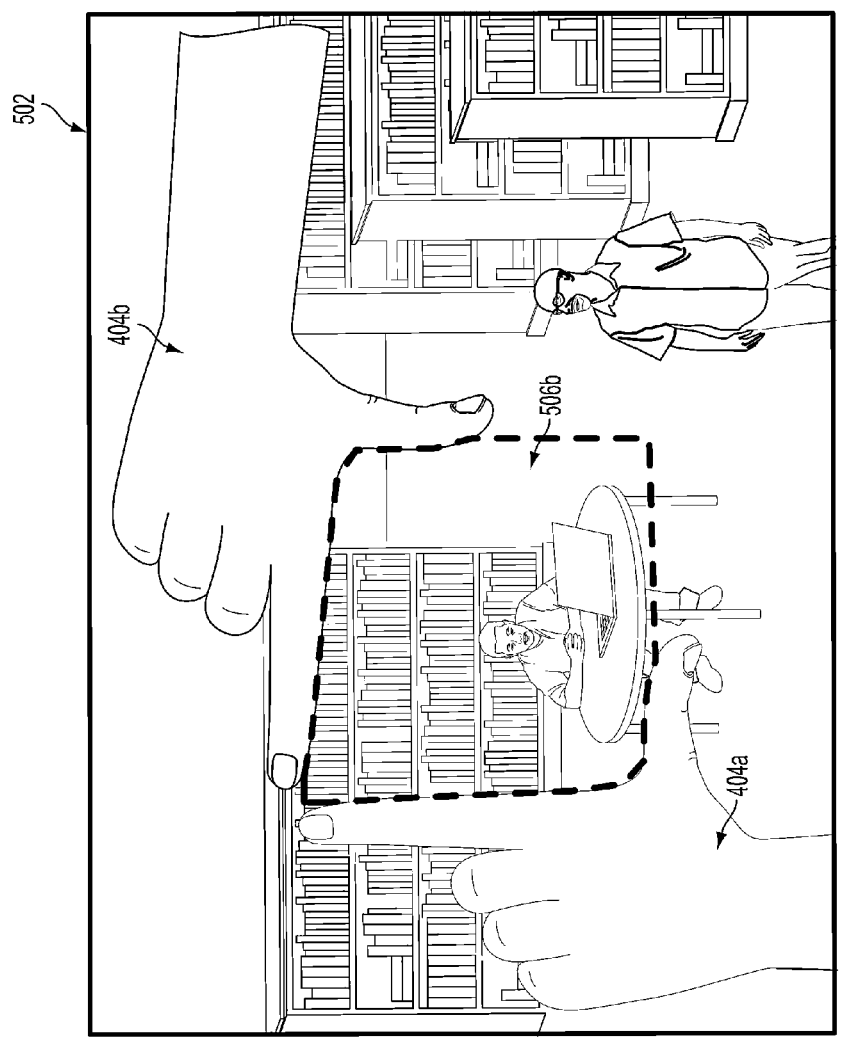

HAND-TRIGGERED HEAD-MOUNTED PHOTOGRAPHY

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mountable displays" (HMDs). A head-mountable display places a graphic display or displays close to one or both eyes of a wearer. To generate the images on a display, a computer processing system may be used. Such displays may occupy a wearer's entire field of view, or only occupy part of wearer's field of view. Further, head-mountable displays may be as small as a pair of glasses or as large as a helmet.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming.

SUMMARY

In one aspect, an exemplary computer-implemented method may involve: (a) receiving, at a computing device, sensor data that is associated with a head-mountable imaging device; (b) analyzing the sensor data to detect a hand gesture comprising a withdrawal of one or more hands from a frame formation; and (c) in response to detecting the withdrawal of the one or more hands from the frame formation, causing the head-mountable imaging device to capture a first image.

In another aspect, a computing system may include an interface configured to receive sensor data that is associated with a head-mountable imaging device and a control system comprising a non-transitory computer readable medium and program instructions stored on the non-transitory computer readable medium. The program instructions may be executable by at least one processor to: (i) analyze the sensor data to detect a hand gesture comprising a withdrawal of one or more hands from a frame formation; and (ii) in response to detecting the withdrawal of one or more hands from the frame formation, causing the head-mountable imaging device to capture a first image.

In a further aspect, a non-transitory computer readable medium may have stored therein instructions that are executable to cause a computing system to perform functions comprising: (a) receiving, at a computing device, sensor data that is associated with a head-mountable camera; (b) analyzing the sensor data to detect a hand gesture comprising a withdrawal of one or more hands from a frame formation; and (c) in response to detecting the withdrawal of the one or more hands from the frame formation, causing the head-mountable camera to capture a first image.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIGS. 4D to 4F show frame formations created with a single hand, according to example embodiments.

FIGS. 5A and 5B both show an image 502 that corresponds to the frame formation illustrated in FIG. 4A.

DETAILED DESCRIPTION

Figure 1A:
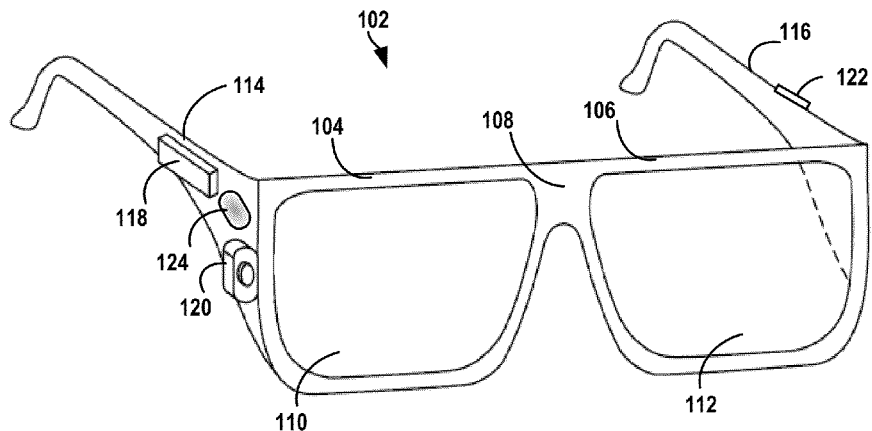
FIG. 1A illustrates a wearable computing system according to an exemplary embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

I. OVERVIEW

Example embodiments involve use of a hand gesture or gestures to take photos with a head-mountable camera (e.g., a camera that is integrated in or attached to a head-mountable device (HMD)). In particular, an HMD may detect when a user creates a frame in their field of view with their hands (e.g., by making an "L" shape with each hand and holding their hands so as to define a rectangular shape). The HMD may then capture an image in response to the user moving their hands out of the frame formation. The image may be captured when the user has, e.g., moved their hands a certain amount or a certain distance from the frame shape they initially formed with their hands, or moved their hands out of the field-of-view of the camera.

In a further aspect, the HMD may perform post-processing of the image based on the hand gesture. For instance, the HMD (or another computing device in communication with the HMD) may crop the photograph based on the portion of the wearer's field of view that was framed by their hands. In some embodiments, the cropped area may be defined by the interior of the shape (e.g., a substantially rectangular frame) formed by the wearer's hands immediately before they remove their hands to initiate the image capture. In other embodiments, the user may frame an object of interest in their field of view (e.g., a person or group of people) so that the HMD can identify the object and crop the image so that the object is presented in a visually appealing manner. For example, the HMD may crop the image so as to center the object of interest, and/or such that the object of interest is a certain size relative to the size of image. Other techniques for cropping the photograph based on the frame formed by the wearer's hands are also possible.

In some embodiments, the HMD may take a first image when it detects the wearer's hands have formed the frame shape, which may help to process the subsequent image that is taken when the wearer withdraws their hands from the frame formation. In particular, since the first image may include the wearer's hands, the HMD can use the frame formed by the wearer's hands in first image to process (e.g., to crop) the second image that is captured when the wearer moves their hands out of the frame shape.

As an alternative to taking a first image for purposes of post-processing, the HMD might track the image coordinates of the frame formed by the wearer's hands, and crop the image using the last image coordinates that were recorded before the image is taken.

In another aspect, the wearer's hands may be used for purposes of white balancing the image that is taken when the wearer moves their hands out of the frame formation. For example, when the HMD detects the wearer has formed a frame with their hands, the HMD may take a first image that includes the wearer's hands, and determine a white balance setting for the first image based upon the appearance of the wearer's hands in the first image. This white balance setting may then be applied to the second image that is taken when the wearer moves their hands out of the frame formation.

Alternatively, white balancing an image based on the wearer's hands could be implemented without the use of a first image that includes the wearer's hands. For instance, when the wearer moves their hands out of the frame formation, the HMD may responsively capture the image just before the wearer's hand move out of the field of view of the camera. The wearer's hands can then be used to adjust the white balance of the image, and can be cropped out of the image, so they don't interfere with the subject the wearer is photographing.

In yet another aspect, the wearer's hands may be used to automatically determine the exposure for the image that is taken when the wearer moves their hands out of the frame formation. For example, a first image of the wearer's hands may be compared to previously captured hand image with a desirable exposure. An exposure setting may be determined that brings the exposure of the first image reasonably close to that of the previously captured image. This exposure setting may then be applied to the image that is taken when the wearer moves their hands out of the frame formation.

It should be understood that the above examples, and other examples described herein, are provided for explanatory purposes, and are not intended to be limiting.

II. EXEMPLARY WEARABLE COMPUTING DEVICES

Systems and devices in which example embodiments may be implemented will now be described in greater detail. In some embodiments, a system may be implemented in or may take the form of a wearable computer, such as an HMD. However, an example system may also be implemented in or take the form of other devices, such as a mobile phone. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

Further, an example system may take the form of or be implemented in a computing system that is in communication with and configured to perform functions on behalf of client device; i.e., a "cloud" computing system. Such a computing system may receive data from a client device such as an HMD or a mobile phone, for example, perform certain processing functions on behalf of the device, and then send the resulting data back to device.

FIG. 1A illustrates a wearable computing system according to an exemplary embodiment. In FIG. 1A, the wearable computing system takes the form of a head-mounted device (HMD) 102 (which may also be referred to as a head-mountable display). It should be understood, however, that exemplary systems and devices may take the form of or be implemented within or in association with other types of devices, without departing from the scope of the invention. As illustrated in FIG. 1A, the head-mounted device 102 comprises frame elements including lens-frames 104, 106 and a center frame support 108, lens elements 110, 112, and extending side-arms 114, 116. The center frame support 108 and the extending side-arms 114, 116 are configured to secure the head-mounted device 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the head-mounted device 102 to the user. The extending side-arms 114, 116 may further secure the head-mounted device 102 to the user by extending around a rear portion of the user's head. Additionally or alternatively, for example, the HMD 102 may connect to or be affixed within a head-mounted helmet structure. Other possibilities exist as well.

The HMD 102 may also include an on-board computing system 118, a video camera 120, a sensor 122, and a finger-operable touch pad 124. The on-board computing system 118 is shown to be positioned on the extending side-arm 114 of the head-mounted device 102; however, the on-board computing system 118 may be provided on other parts of the head-mounted device 102 or may be positioned remote from the head-mounted device 102 (e.g., the on-board computing system 118 could be wire- or wirelessly-connected to the head-mounted device 102). The on-board computing system 118 may include a processor and memory, for example. The on-board computing system 118 may be configured to receive and analyze data from the video camera 120 and the finger-operable touch pad 124 (and possibly from other sensory devices, user interfaces, or both) and generate images for output by the lens elements 110 and 112.

The video camera 120 is shown positioned on the extending side-arm 114 of the head-mounted device 102; however, the video camera 120 may be provided on other parts of the head-mounted device 102. The video camera 120 may be configured to capture images at various resolutions or at different frame rates. Many video cameras with a small form-factor, such as those used in cell phones or webcams, for example, may be incorporated into an example of the HMD 102.

Further, although FIG. 1A illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown on the extending side-arm 116 of the head-mounted device 102; however, the sensor 122 may be positioned on other parts of the head-mounted device 102. The sensor 122 may include one or more of a gyroscope or an accelerometer, for example. Other sensing devices may be included within, or in addition to, the sensor 122 or other sensing functions may be performed by the sensor 122.

The finger-operable touch pad 124 is shown on the extending side-arm 114 of the head-mounted device 102. However, the finger-operable touch pad 124 may be positioned on other parts of the head-mounted device 102. Also, more than one finger-operable touch pad may be present on the head-mounted device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

Figure 1B:
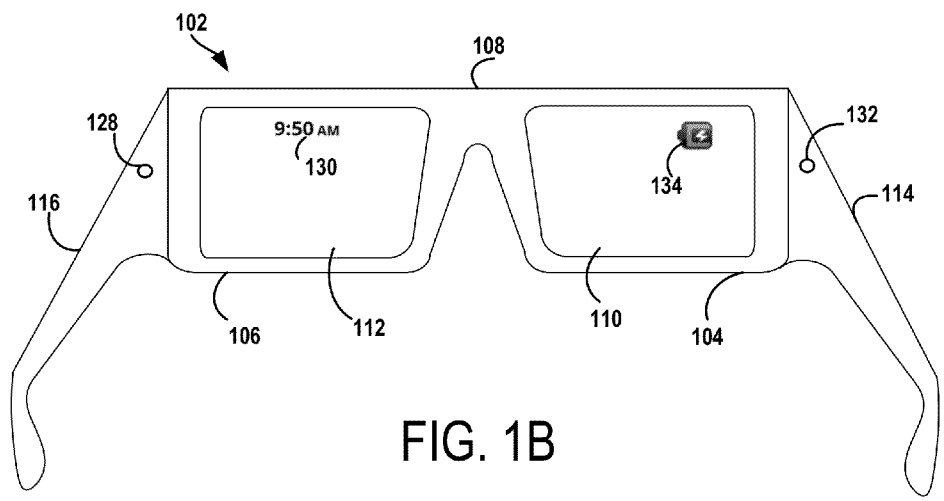
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The head-mounted device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
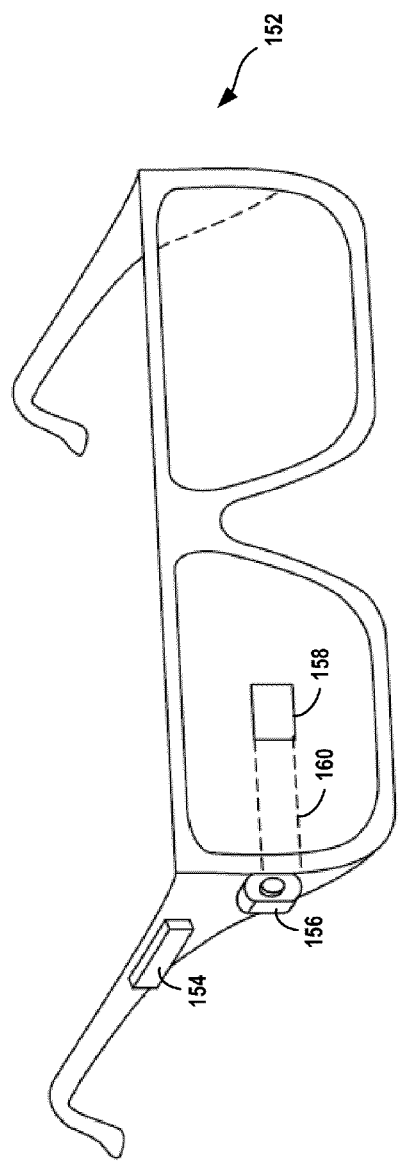
FIG. 1C illustrates another wearable computing system according to an exemplary embodiment.

FIG. 1C illustrates another wearable computing system according to an exemplary embodiment, which takes the form of an HMD 152. The HMD 152 may include frame elements and side-arms such as those described with respect to FIGS. 1A and 1B. The HMD 152 may additionally include an on-board computing system 154 and a video camera 206, such as those described with respect to FIGS. 1A and 1B. The video camera 206 is shown mounted on a frame of the HMD 152. However, the video camera 206 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions. The display 158 is controllable via the computing system 154 that is coupled to the display 158 via an optical waveguide 160.

Figure 1D:
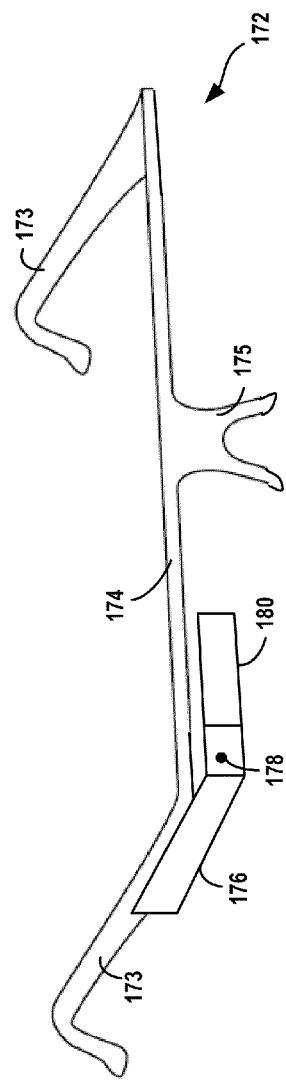
FIG. 1D illustrates another wearable computing system according to an exemplary embodiment.

FIG. 1D illustrates another wearable computing system according to an exemplary embodiment, which takes the form of an HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include an on-board computing system 176 and a video camera 178, such as those described with respect to FIGS. 1A and 1B.

The HMD 172 may include a single lens element 180 that may be coupled to one of the side-arms 173 or the center frame support 174. The lens element 180 may include a display such as the display described with reference to FIGS. 1A and 1B, and may be configured to overlay computer-generated graphics upon the user's view of the physical world. In one example, the single lens element 180 may be coupled to the inner side (i.e., the side exposed to a portion of a user's head when worn by the user) of the extending sidearm 173. The single lens element 180 may be positioned in front of or proximate to a user's eye when the HMD 172 is worn by a user. For example, the single lens element 180 may be positioned below the center frame support 174, as shown in FIG. 1D.

Figure 2:
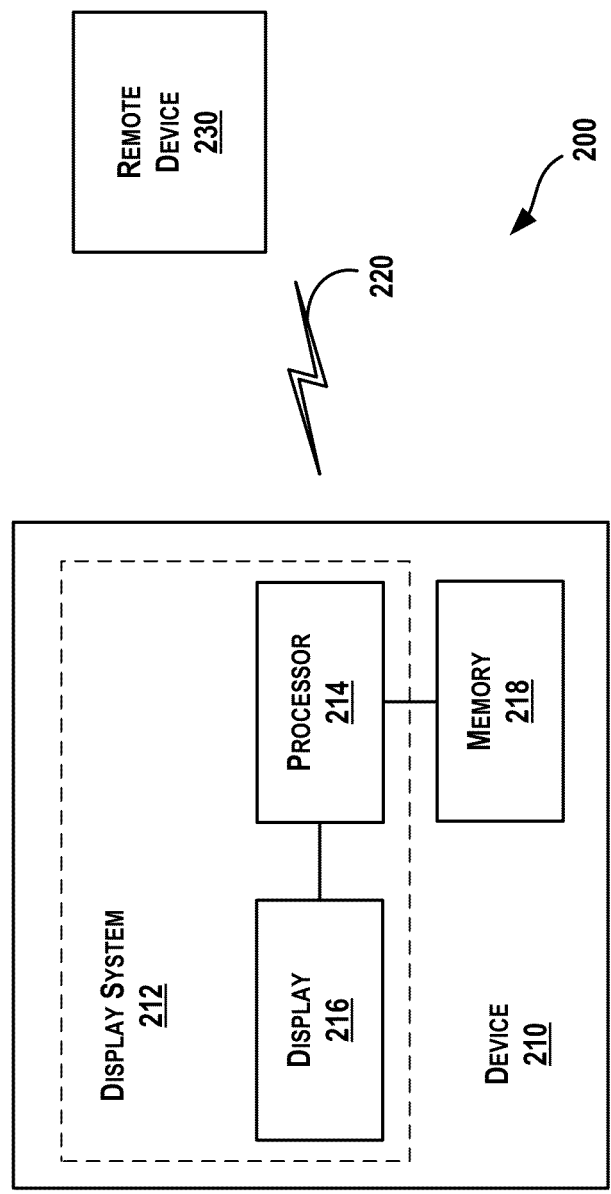
FIG. 2 illustrates a schematic drawing of a computing device according to an exemplary embodiment.

FIG. 2 illustrates a schematic drawing of a computing device according to an exemplary embodiment. In system 200, a device 210 communicates using a communication link 220 (e.g., a wired or wireless connection) to a remote device 230. The device 210 may be any type of device that can receive data and display information corresponding to or associated with the data. For example, the device 210 may be a heads-up display system, such as the head-mounted devices 102, 152, or 172 described with reference to FIGS. 1A-1D.

Thus, the device 210 may include a display system 212 comprising a processor 214 and a display 216. The display 210 may be, for example, an optical see-through display, an optical see-around display, or a video see-through display. The processor 214 may receive data from the remote device 230, and configure the data for display on the display 216. The processor 214 may be any type of processor, such as a microprocessor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, or tablet computing device, etc., that is configured to transmit data to the device 210. The remote device 230 and the device 210 may contain hardware to enable the communication link 220, such as processors, transmitters, receivers, antennas, etc.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via a packet-switched network such as the Internet and may include a computing cluster associated with a particular web service (e.g., social-networking, photo sharing, address book, etc.).

III. EXEMPLARY METHODS

Figure 3:
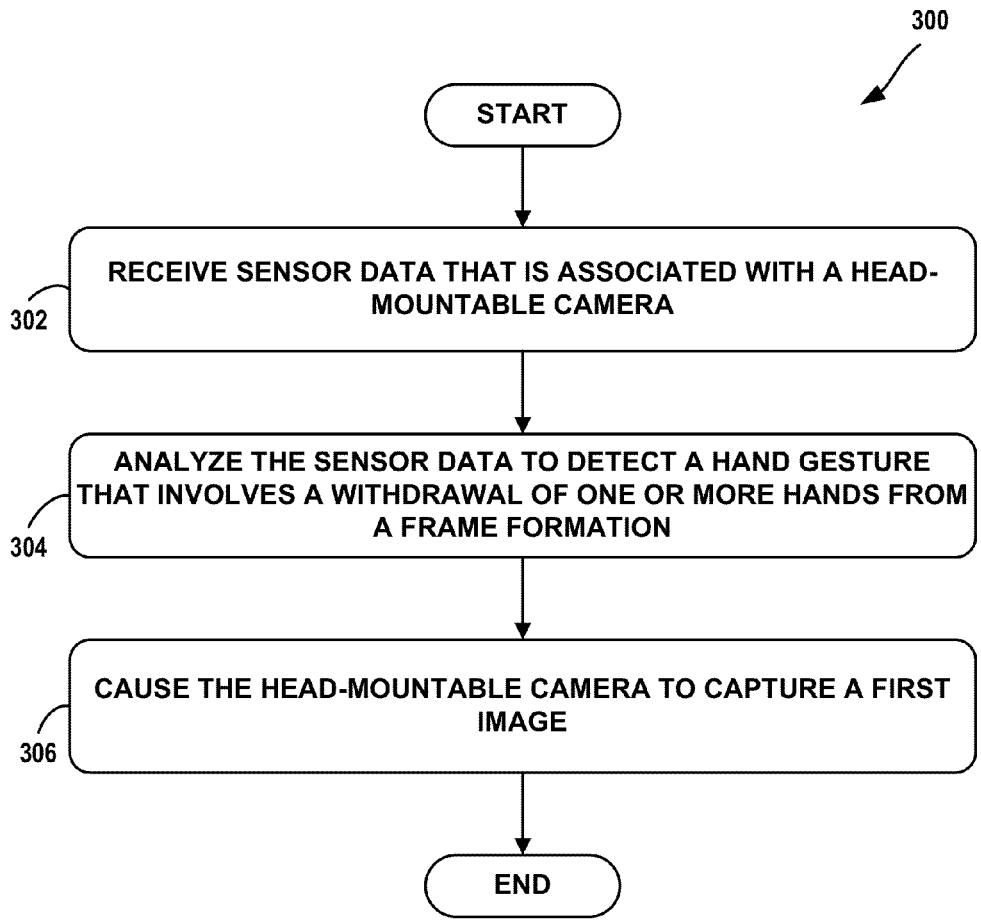
FIG. 3 is a flow chart illustrating a method 300, according to an example embodiment.

FIG. 3 is a flow chart illustrating a method 300, according to an example embodiment. Illustrative methods, such as method 300, may be carried out in whole or in part by an HMD, such as the head-mountable displays shown in FIGS. 1A to 1D. Example methods, or portions thereof, could also be carried out by other computing devices, such as a mobile phone, alone or in combination with an HMD. Further, an example method, or portions thereof, may be carried out by computing device that is in communication with an HMD and/or in communication with device such as a mobile phone (e.g., a "cloud" computing system). An example method may also be carried out by other types of computing devices and/or combinations of computing devices, without departing from the scope of the invention.

As shown by block 302, method 300 involves a computing device receiving sensor data that is associated with a head-mountable camera. The computing device may then analyze the sensor data to detect a hand gesture that involves a withdrawal of one or more hands from a frame formation, as shown by block 304. In response to the withdrawal of the one or more hands from the frame formation, the computing device causes the head-mountable camera to capture a first image, as shown by block 306. In some examples, the first image may also be referred to as a "withdrawal-responsive image," since it is captured in response to withdrawal of one or more hands from a certain formation.

The sensor data that is received at block 302 may take various forms. For instance, in some embodiments, the computing device may receive image data, such as one or more still images or video, which is captured by the head-mountable camera (HMC). In some embodiments, the HMC may capture lower-resolution image data (e.g., low-resolution still images or video), which may be analyzed for the presence of one or two hands positioned in a frame formation and a subsequent withdrawal from the frame formation. In such an embodiment, the withdrawal-responsive (WR) image captured by the HMD may be a higher-resolution image (as compared to a preliminary image or video that is analyzed to detect the hand gesture and determine settings for processing the withdrawal-responsive image).

In other embodiments, different sensing technologies could be used to detect the hand motions used in embodiments described herein. For example, some embodiments may employ a structured light system, such as a system that detects objects by transmitting infrared or near-infrared light and measuring the time-of-flight of reflections off the objects, for instance. As another example, some embodiments may utilize laser-range finders to sense nearby objects, including the wearer's hands. As yet another example, an HMD could utilize two cameras to build a 3d model of the wearer's environment, and then detect hand motions from the d3d model. And, as yet another example, the wearer could wear sensing technology on their hands from which the position of their hands could be determined. For instance, the wearer could use gloves with RFIDs that are arranged such that the position of the hand can be determined. Other sensing systems are possible as well.

Note that while embodiments herein are generally described as being carried out by an HMD or an associated device that captures an image in response to the HMD wearer withdrawing their hands from a frame formation, other embodiments may involve capturing an image in response to a hand gesture by someone other than the user of the device with which the camera is associated. For example, a computing device such as a mobile phone could implement a method in which the device captures an image in response to a person who is the subject of the image forming and withdrawing their hands from a frame formation. Other examples are also possible.

A. Withdrawal of Frame Formation to Trigger Image Capture

At block 304 of method 300, the withdrawal of the frame formation may be detected using various techniques.

In an example embodiment, a wearer may hold their hands in the frame formation in front of their face such that a certain aspect or aspects of the wearer's environment is framed, within the wearer's field of view. The wearer may perform a "pulling away" gesture, in which the wearer pulls their hand or hands out of their field of view (or away from the center of their field of view), in order to take a picture. Since an HMC will typically capture image data that is representative of what the wearer is viewing, the frame formation will typically be within the field of view of the HMC when held in front of the wearer's face. Accordingly, after detecting a frame formation in the field of view of the HMC, movement of the wearer's hand or hands towards the periphery of the HMC's field of view may be interpreted as withdrawal of the frame formation.

In a further aspect, the timing with which an image is captured may vary according how and when the HMC detects withdrawal from the frame formation. For instance, at block 304, the computing device may consider the frame formation to be withdrawn when it detects that the wearer's hand(s) have moved outside the field of view of the HMC (e.g., such that image data from the HMC no longer captures the wearer's hand(s)). Thus, at block 306, the HMC may capture an image as soon as it detects that the wearer's hand(s) have moved outside the field of view of the HMC.

In other embodiments of method 300, the computing device may consider the frame formation to be withdrawn before the wearer's hand or hands are pulled out of the field of view of the HMC. For example, the computing device may consider withdrawal to have occurred when the user's hands have moved at least a predetermined distance from the area that was framed by the wearer's hands. As another example, the computing device may consider withdrawal to have occurred, and responsively capture an image, when it detects that the wearer's hand or hands are at the edge or within a certain distance from the edge of the HMC's field of view.

In some embodiments, the computing device may require that the movement of the hands towards the edge of the HMC's field of view be performed at least a certain speed. For example, a computing device may not consider a movement of less than a certain distance (e.g., a certain number of pixels) between frames to be a withdrawal of the frame formation, and thus may not initiate image capture unless the movement is greater than a certain distance between frames (e.g., greater than a distance corresponding to a threshold speed of movement).

B. Examples of Frame Formations

Figure 4A:
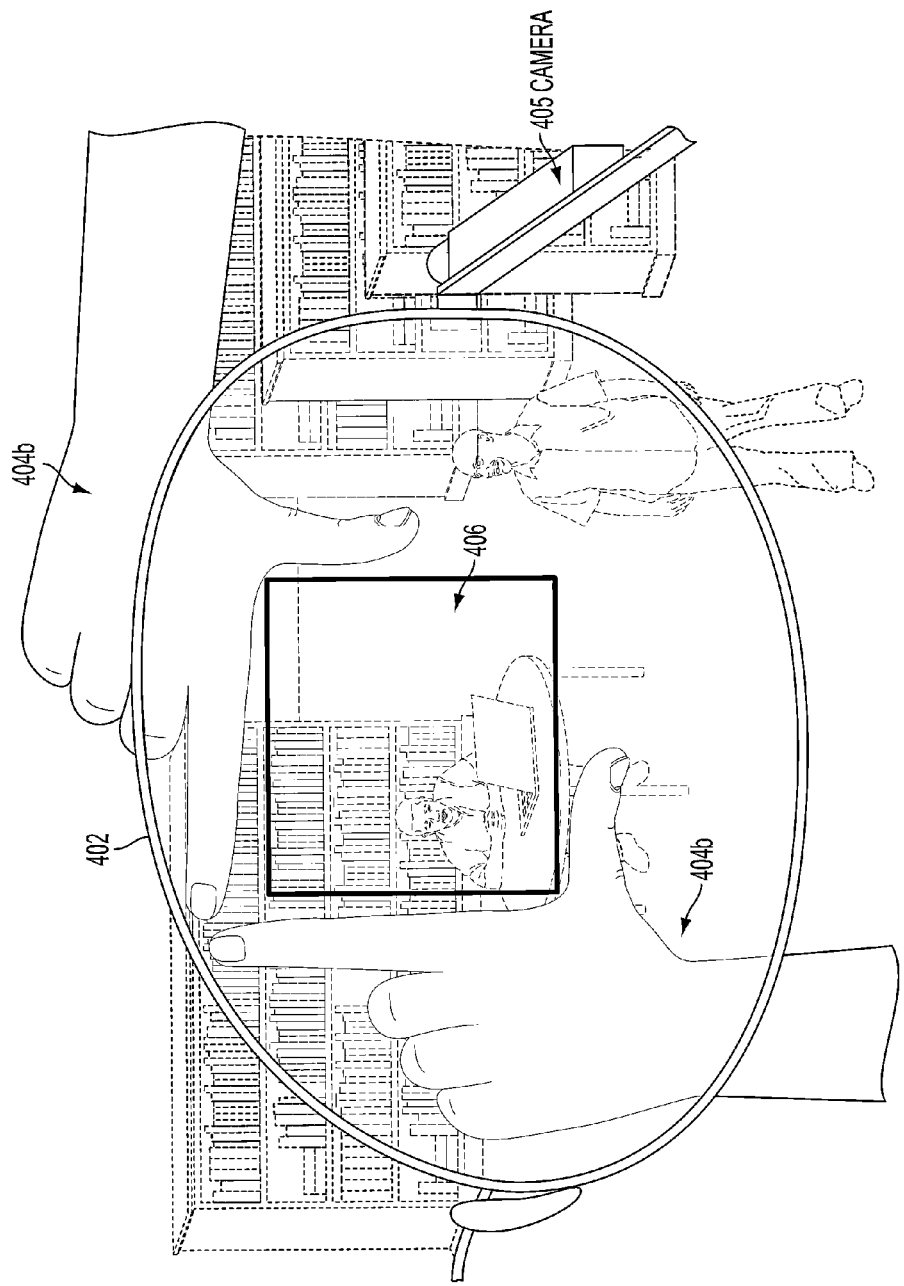
FIGS. 4A to 4C show frame formations created with two hands, according to example embodiments.
Figure 4B:
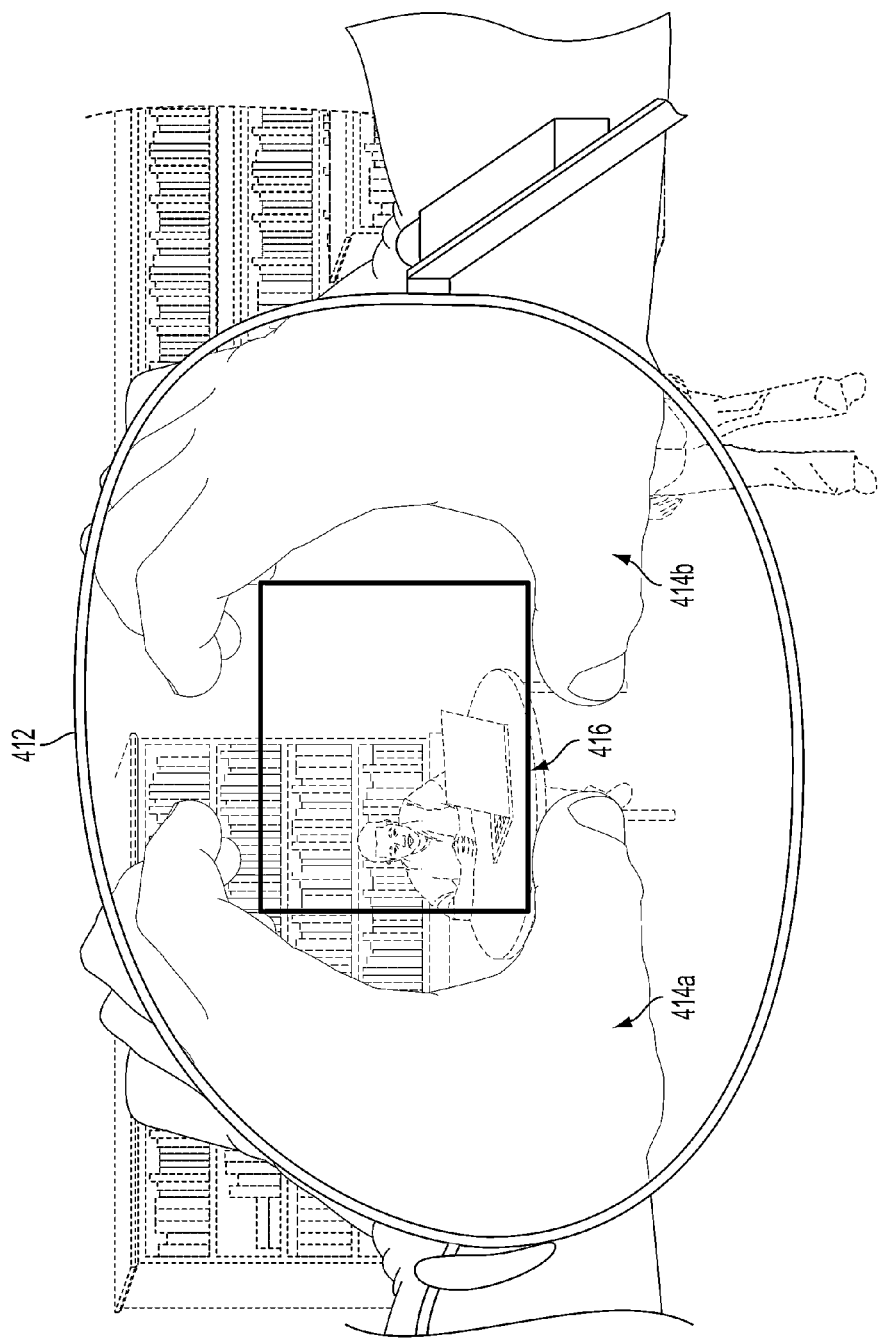
Figure 4C:
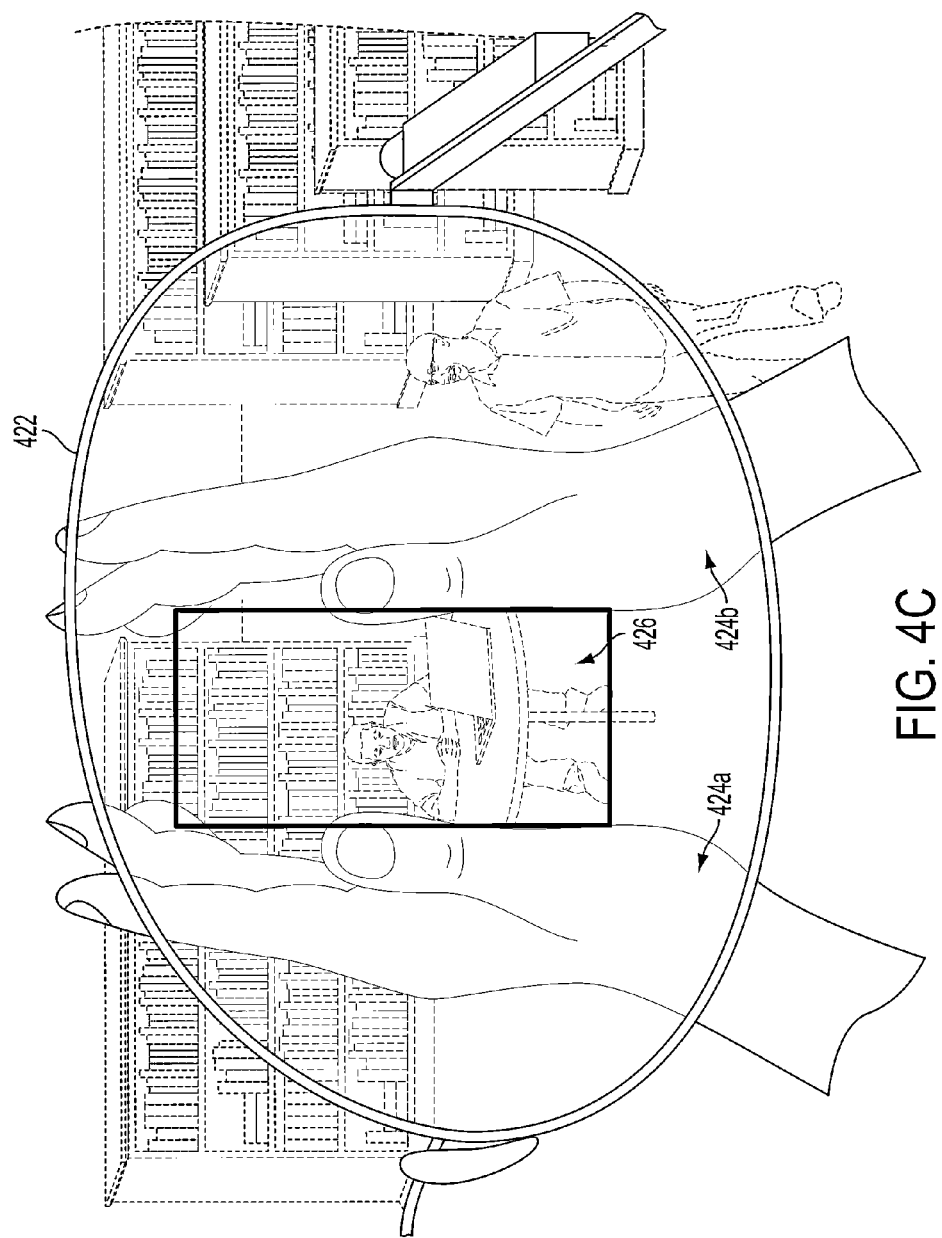

Further, at block 304, the computing device may detect the withdrawal from various types of frame formations by one or more hands, depending upon the particular implementation. For example, FIGS. 4A to 4C show frame formations created with two hands, according to example embodiments. More specifically, in FIG. 4A, a wearer of an HMD 402 is holding both of their hands 404a and 404b in an "L-shaped" position. Further, the wearer's hands 404a and 404b are positioned relative to one another such that they define a "frame" having a substantially rectangular shape. The HMD may include a camera 405, which is configured to capture image data from the perspective of the wearer of HMD 402 (e.g., point-of-view image data).

Note that in some implementations, the computing device may conclude that a frame has been formed even when the hands 404a and 404b do not touch one another. For example, the computing device may consider a frame to have been formed when the hands are held in substantially the same position relative to one another, such as the position shown in FIG. 4A, for a certain period of time. Of course, the computing device may allow for some amount of movement of the hands (e.g., to account for natural hand jitter), while still considering the hands to be held in the frame formation.

Other positions of two hands may be identified by the computing device as a frame formation. For example, in FIG. 4B, a wearer of an HMD 412 has formed a frame by holding their hands 414a and 414b in opposing "C-shaped" positions. As another example, in FIG. 4C, a wearer of an HMD 422 has formed a frame by holding their hands 424a and 424b substantially parallel to one another. Other relative positions and shapes formed by two hands may also be considered to be frame formations in accordance with an example method 300.

Figure 4D:
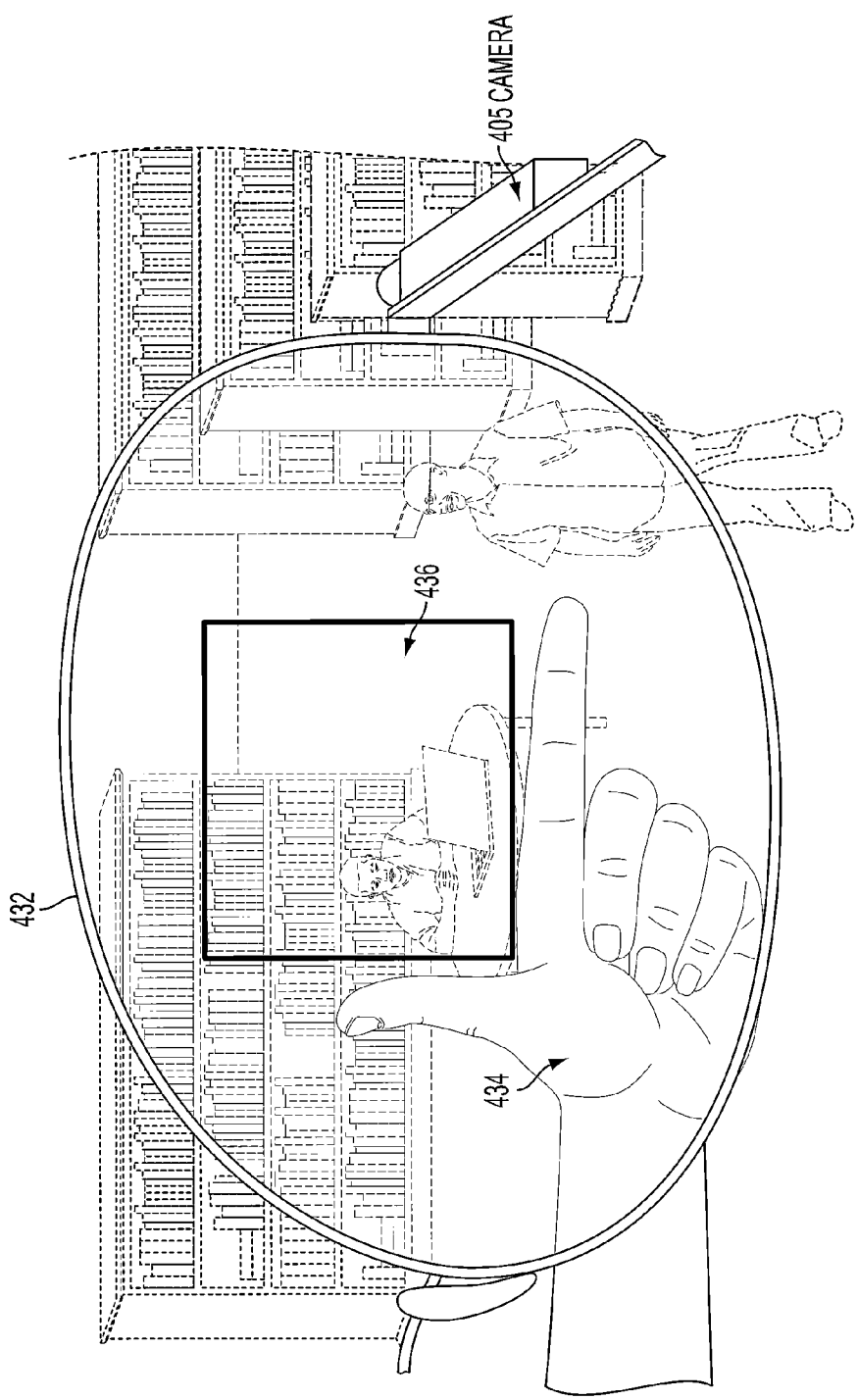
Figure 4F:
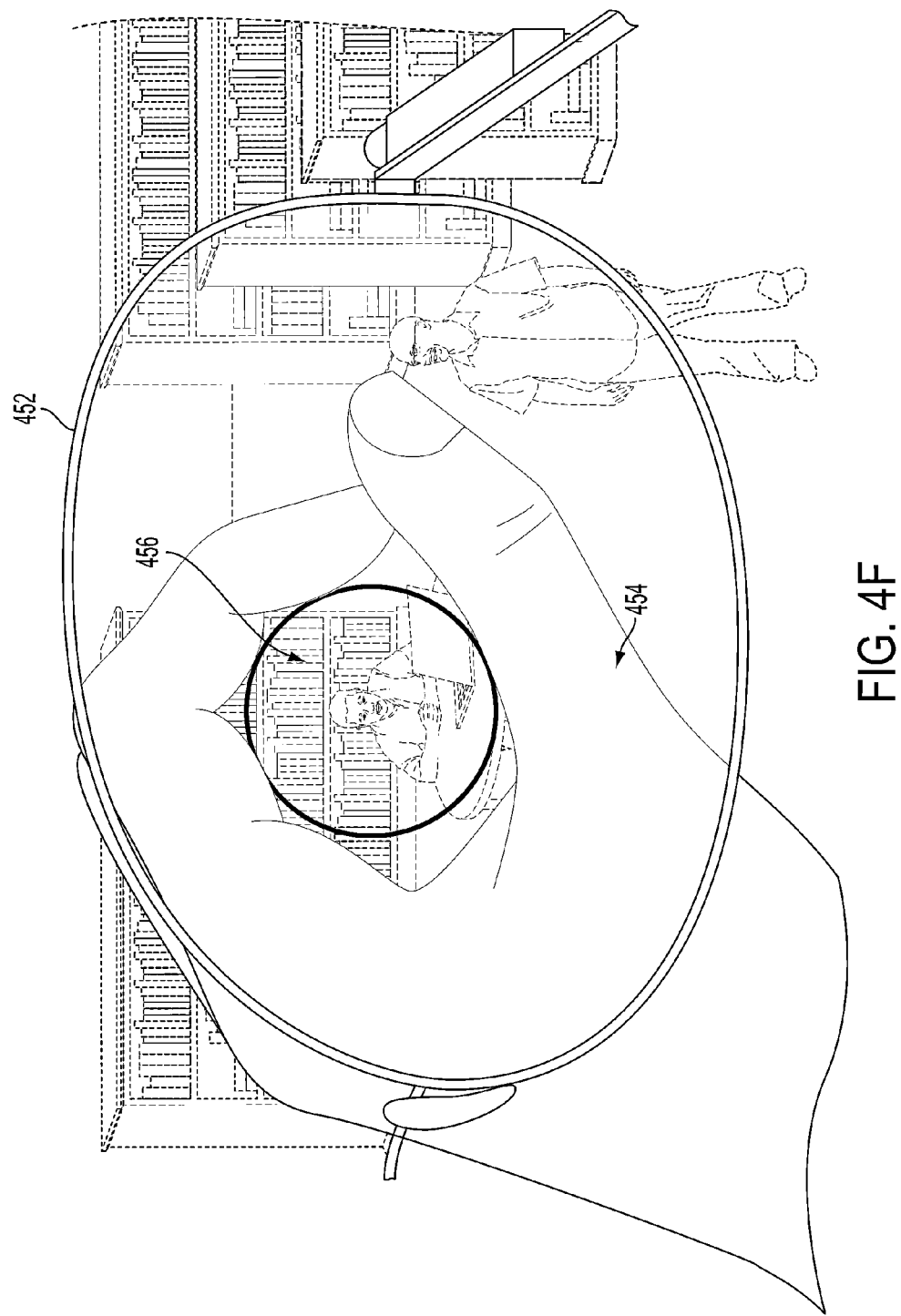

In some embodiments, a frame may also be identified based on the position and/or shape of a single hand. For instance, FIGS. 4D to 4F show frame formations created with a single hand, according to example embodiments. More specifically, in FIG. 4D, a wearer of an HMD 432 has formed a frame by holding a hand 434 in an "L" shape. In FIG. 4E, a wearer of an HMD 442 has formed a frame by holding a hand 444 in a "C" shape. Further, in FIG. 4F, a wearer of an HMD 452 has formed a frame by holding a hand 454 in a round shape. Other shapes formed by a single hand may also be considered to be frame formations in accordance with an example method 300.

It should be understood that the examples of frame formations shown in FIGS. 4A to 4F are not intended to be limiting. Any shape and/or position of one or more hands that can be interpreted to define a "selection area," as described in greater detail below, may be identified as a frame formation. The capture of an image may therefore be initiated in response to the withdrawal from one, some, or all of the frame formations shown in FIGS. 4A to 4F, and/or in response to other frame formations that are not specifically illustrated in the Figures, depending upon the particular implementation.

In a further aspect, each FIG. 4A to 4F shows a selection area 406, 416, 426, 436, 446, and 456, respectively, which is an area in the wearer's field of view that the wearer may understand to be framed by the respectively illustrated frame formation. As noted, a frame formation may be any positioning and/or shape of one or more hands that can be interpreted to specify a selection area. The selection area may therefore be the area in the withdrawal-responsive image that, if the HMD is being worn, corresponds to the frame formation in the wearer's field of view (e.g., the area of the image that corresponds to the aspects of the physical world that the wearer sees and/or understands to be framed by the frame formation of their hands). Accordingly, the computing device may process the withdrawal-responsive image based on the selection area, such as by cropping the image and/or editing the image in other ways.

Note that in the examples illustrated in FIGS. 4A to 4F, the wearer may be using an optical see-through display (e.g., such as illustrated in FIGS. 1A to 1D), which includes a camera that is offset slightly from the wearer's actual line of sight. If a camera is offset from the wearer's line of sight (as is illustrated by cameras 120, 156, and 178 of FIGS. 1A, 1C, and 1D, respectively), then the images from the HMC may show a slightly different alignment of the wearer's hands with respect to the wearer's environment from that which the wearer actually sees.

As such, areas 406, 416, 426, 436, 446, and 456, may not represent the area that is actually framed by the wearer's hand or hands in the image data from the HMC. Since area of an image that is framed may be offset from what a wearer perceives to be framed, the computing device may first determine a "frame area" in image data from the HMC, based on the location of the wearer's hand or hands in the image. The computing device may then adjust the frame area to account for translation and determine a selection area in the image that corresponds to the area 406, 416, 426, 436, 446, or 456 in the wearer's field of view, so as to better set the selection area to be what the wearer perceives to be selected by the frame formation.

C. Determining a Selection Area Specified by a Frame Formation

Since an example method 300 may involve the computing device capturing an image in response to the withdrawal of the hand(s) from a frame formation, the HMC may not capture the frame formation in the image. Accordingly, the computing device may use sensor data that is acquired prior to the withdrawal of the hand(s) from the frame formation to detect the frame formation of the hands and determine a selection area in the later-captured withdrawal-responsive image.

For instance, in some embodiments, an example method 300 may further involve the computing device analyzing sensor data, such as low-resolution image data from the HMC, and detecting when a user hands are shaped and/or positioned in a frame formation. The computing device may then determine a frame area within the field-of-view (FOV) of the camera, which corresponds to the frame formation. For example, the computing device may analyze an image or images that are captured prior to withdrawal from the frame formation and determine a frame area in the image or images based on the position and/or shape of the frame formation in the image or images.

Figure 5A:
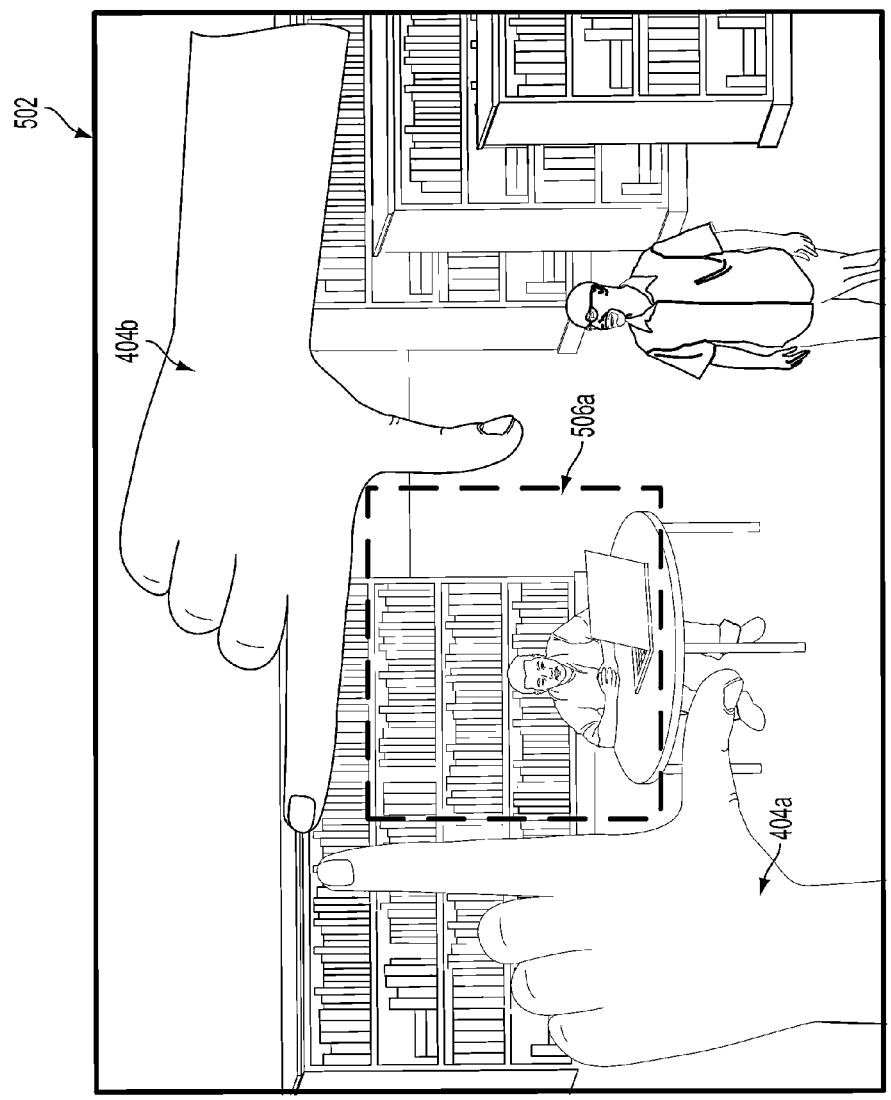

For example, FIGS. 5A and 5B both show an image 502 that corresponds to the frame formation illustrated in FIG. 4A. As such, image 502 captures the frame formation created by hands 404a and 404b in FIG. 4A as well as the wearer's environment. However, FIGS. 5A and 5B show different frame areas 506a and 506b that could be determined based on the frame formation that is captured in image 502, according to two different implementations. (Note that the frame areas 506a and 506b are shown as dotted lines as they are not captured in the image itself.)

More specifically, the shape and/or positioning of the hands when held in the frame formation may define a frame area in an image that captures the frame formation. For example, FIG. 5A shows how boundaries of a rectangular frame area 506a can be determined based on the general direction in which the fingers point. On the other hand, FIG. 5B shows how the frame area could be an organic shape that is defined, at least in part, by the interior edges of the hands 404a and 404b. (Note that the general shape of finger or fingers may also define a boundary in a similar manner as the interior edge can; in other words the boundary does not need to be exactly on the edge of the finger.)

Further, in an embodiment where a frame formation can be formed by positioning two hands in a shape that is not closed, such as the frame formation illustrated in FIGS. 4A to 4C, the frame area may be defined by extending a boundaries from the ends of fingers on opposing hands until the boundaries meet and define a closed frame area. For example, in both FIGS. 5A and 5B, the respective frame areas 506a and 506b may be closed by extending boundaries from the ends of fingers, in a general direction the finger is pointing, until the boundaries intersect and close the respective frame area.

As noted above, the alignment of hands 404a and 404b in an image 502 may differ from what the wearer of an HMC actually perceives as being framed, due to a configuration in which the perspective captured by the HMC is offset from the wearer's line of sight.

Accordingly, to determine the selection area in an image that captures a frame formation, a computing device may adjust the frame area to account for translation between the camera's alignment and the wearer's line of sight. The selection area may then be used to process the image that is subsequently captured in response to the withdrawal of the frame formation.

Figure 6:
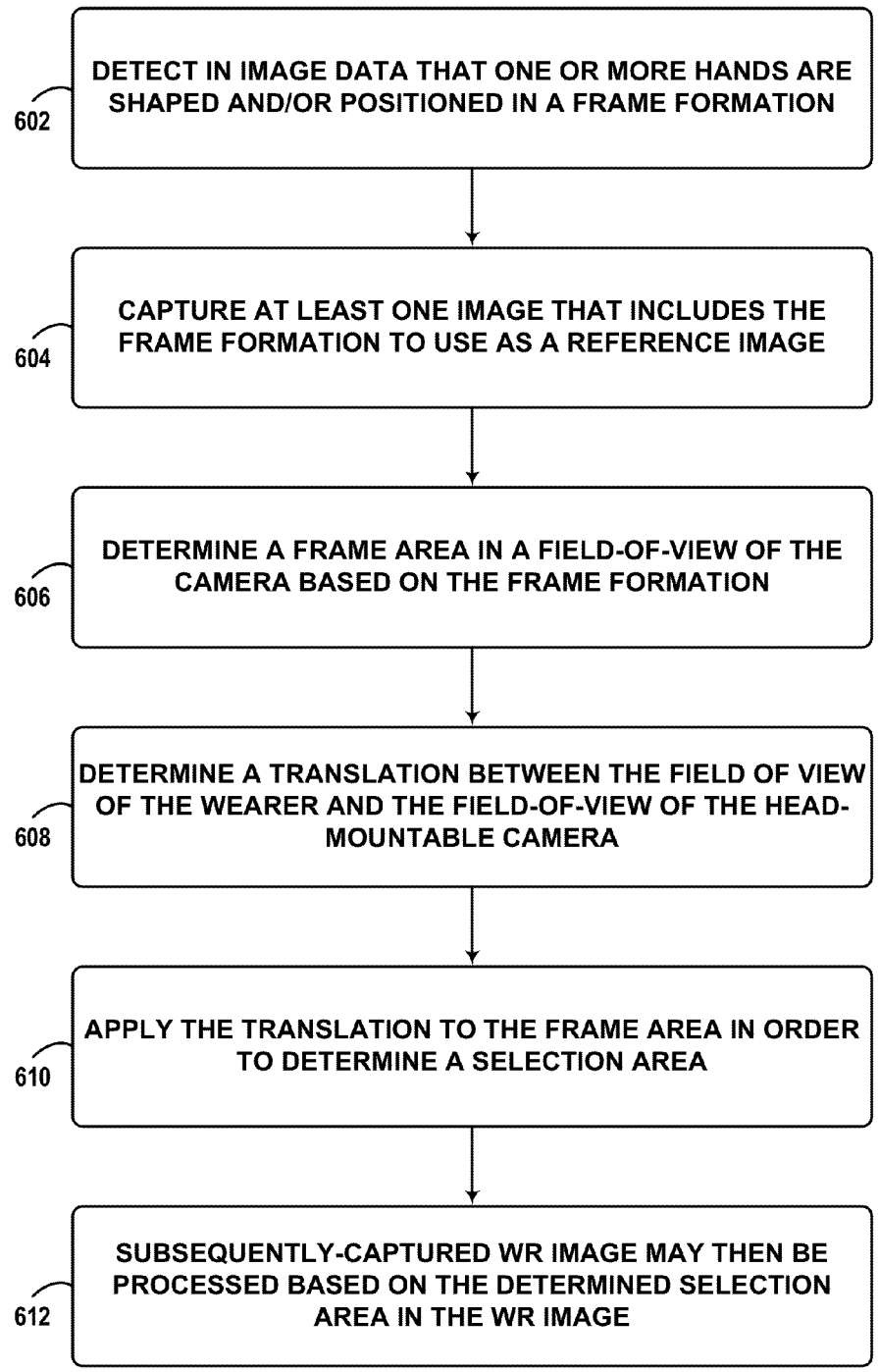
FIG. 6 is a flow chart illustrating a method for determining a selection area in an image and processing the image based on the selection area, according to an example embodiment.

FIG. 6 is a flow chart illustrating a method for determining a selection area in an image and processing the image based on the selection area, according to an example embodiment. The functions of method 600 may be implemented as part of an implementation of method 300 in which the hand gesture includes both the placement of one or more hands in a frame formation, and the subsequent withdrawal of the one or more hands from the frame formation.

As shown by block 602, method 600 involves the computing device detecting in image data that the one or more hands are shaped and/or positioned in the frame formation. In response to detecting the frame formation in the image data, the computing device may capture or designate at least one image that includes the frame formation to use as a reference image, as shown by block 604. Further, the computing device may determine a frame area in a field-of-view of the camera (e.g., image coordinates in the reference image) based on the frame formation, as shown by block 606. The frame area may be determined in various ways and may take various forms, such as those described above in reference to FIGS. 5A and 5B, among other possibilities.

The computing device may then determine a selection area based on the determined frame area. More specifically, in the illustrated method, the computing device may determine a selection area by determining a translation between the field of view of the wearer and the field-of-view of the head-mountable camera, as shown by block 608. Note that the translation may be determined at an earlier time, before the frame formation is detected, and could also be re-determined periodically in order to account for, e.g., the wearer adjusting the placement of an HMD frame on their head or slippage of the HMD. Alternatively, the translation between the field of view of the wearer and the field-of-view of the head-mountable camera could be determined on an as-needed basis, in response to detecting the frame formation. In either case, the computing device may apply the translation to the frame area in order to determine a selection area, as shown by block 610. A subsequently-captured withdrawal-responsive image may then be processed based on the determined selection area in the withdrawal-responsive image, as shown by block 612.

Note that in some embodiments, the selection area may be defined by image coordinates in the reference image, which may be directly translated from reference image that includes the frame formation, to the subsequent withdrawal-responsive image. In some embodiments, a computing device may use stereo-vision techniques based on epipolar geometry by treating the wearer's eye as one camera and using the HMD's camera as the other camera that provide stereo vision. In particular, a computing device may utilize epipolar constraint and triangulation or similar techniques. For example, the distance between the wearer's eye and the HMD's camera may be determined or may be known, Further, the size of human hands may be predefined and/or learned by observing the position and size (e.g., in pixels) of the wearer's hand in the camera image. As such, the computing device may be able to estimate of the location of the wearer's hands in space, relative to the HMD's camera. Provided with this information, the computing device can determine the location (e.g., pixel coordinates) in an image that the wearer was framing, from the wearer's perspective. Such techniques for determining translation between an HMC and the perspective from the wearer's eye are well known in the art and thus not described in further detail herein.

In some embodiments, the computing device may determine the selection area in the withdrawal-responsive image by associating the location and/or size of the selection area in the reference image with aspects of the wearer's environment that are captured in the reference image. The computing device may then identify the same aspects of the environment in the subsequent withdrawal-responsive image, and define the selection area in withdrawal-responsive image based on the locations of those aspects in the withdrawal-responsive image.

IV. PROCESSING AN IMAGE BASED ON THE FRAME FORMATION

In a further aspect, a computing device may use the selection area defined by the frame formation in a reference image to process a subsequent withdrawal-responsive image. For example, the computing device may determine a crop area based on a selection area that is defined by a frame formation of the hands, and may then crop the withdrawal-responsive image based on the crop area.

A. Cropping an Image

In some embodiments, the selection area may be used as the crop area. Accordingly, the withdrawal-responsive image may be cropped at the boundaries of the selection area. In other embodiments, a crop area may be based on, but different from the selection area.

Figure 7A:
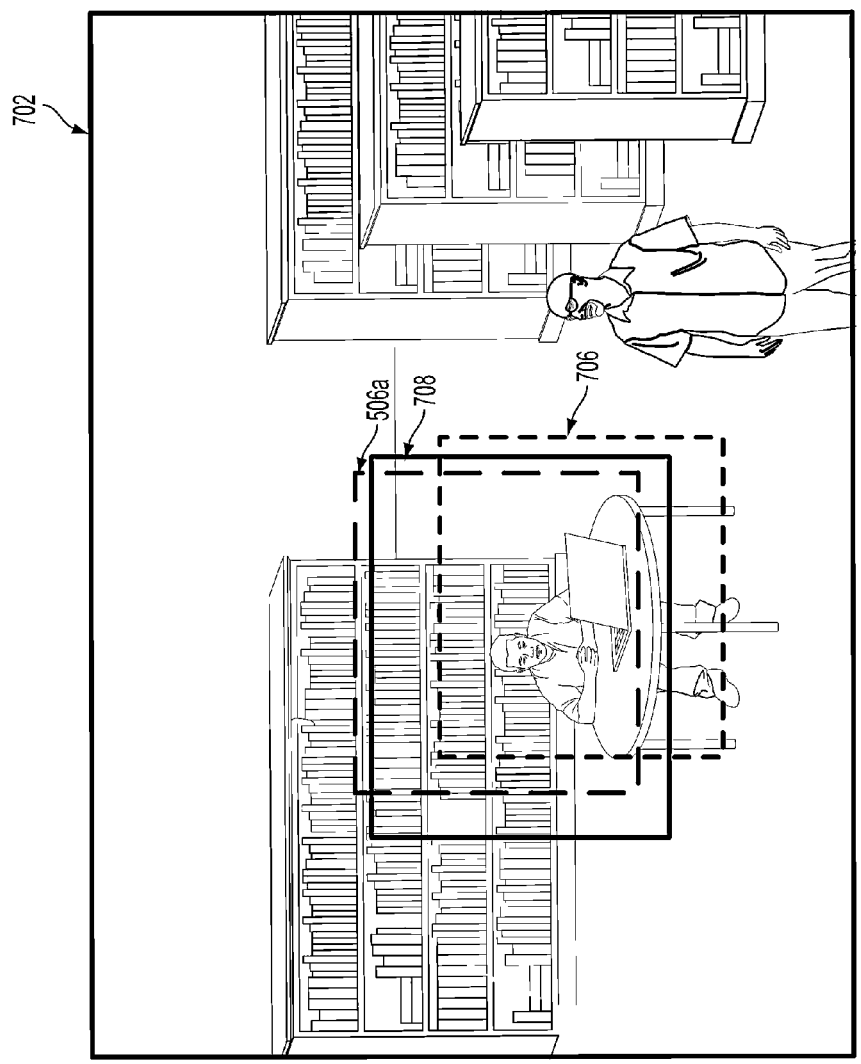
FIG. 7A illustrates a withdrawal-responsive image 702, according to an example embodiment.
Figure 7B:
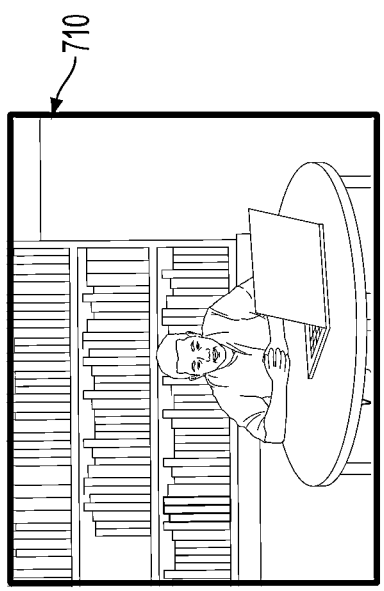
FIG. 7B shows an image 710 that results from cropping the withdrawal-responsive image 702 of FIG. 7A based on crop area 708.

As a specific example, FIG. 7A illustrates a withdrawal-responsive image 702, according to an example embodiment. In particular, withdrawal-responsive image 702 may be taken upon withdrawal of the hands from the frame formation captured in reference image 502 of FIG. 5A. Accordingly, the reference image 502 may be used to process withdrawal-responsive image 702. In particular, the location of the hands in reference image 502 may be used to determine the frame area 506a in the reference image. As shown in FIG. 7A, the frame area 506a may then be mapped to the withdrawal-responsive image 702. A selection area 706 may then be determined by shifting and/or warping the frame area 506a in order to account for translation between the wearer's field of view and the camera's field of view. A crop area 708 may then be determined based on the selection area 706. The withdrawal-responsive image 702 may then be cropped according to the crop area 708. For instance, FIG. 7B shows an image 710 that results from cropping the withdrawal-responsive image 702 of FIG. 7A based on crop area 708.

Various cropping techniques may be used to visually highlight an aspect of the wearer's environment that is located within a selection area of a withdrawal-responsive image. For example, in the illustrated embodiment, crop area 708 may be determined such that cropping the withdrawal-responsive image visually highlights aspects of the wearer's environment within the selection area in the reference image. For instance, in FIG. 7A, the person's face is centered within the crop area 708 of the withdrawal-responsive image 702. Further, the computing device has set the size of the crop area 708 such that the person's face is of a desired size in relation to the crop area (e.g., so that the person's face will fill a certain amount of the frame once image 702 is cropped). Various other cropping techniques based on the selection area are possible, depending upon the particular implementation.

In another aspect, a computing device may take advantage of the fact that the reference image includes the wearer's hands to determine various image-adjustment settings for the subsequent withdrawal-responsive image. For example, the computing device may identify a portion or portions of a reference image that include one or more of the wearer's hands. The computing device may then determine one or more image-adjustment settings, such as a white-balance or exposure setting (e.g., by analyzing the reference image and taking advantage of certain known characteristics of the wearer's hand or hands), and apply the image-adjustment setting or settings to the withdrawal-responsive image.

B. White Balancing an Image

In some implementations, a computing device may utilize a reference image that includes the wearer's hands, such as reference image 502 of FIG. 5A, to adjust the white balance of the subsequent withdrawal-responsive image. More specifically, human skin tones may provide an acceptable reference color for adjusting the white balance in an image. Accordingly, the computing device may identify a portion or portions of the reference image that includes one or both of a wearer's hands, and determine a white balance setting for the reference image based on the coloration of the wearer's hands in the reference image. The computing device may then apply the same white balance setting to the withdrawal-responsive image. An example embodiment may utilize various white balancing techniques, which are currently known or yet to be developed.

In other implementations, a computing device may determine a white balance setting for the reference image based on other object or objects the reference image that are known are expected to be white (or possibly even another known color). For instance, a computing device may utilize object-recognition techniques to determine that there are stacks of paper in a reference image, which it expects should be white. Accordingly, white balancing may be performed based on the coloration of the stacks of paper in the reference image. Other examples are also possible.

C. Adjusting the Exposure of an Image

Additionally or alternatively, a computing device may utilize a reference image that includes the wearer's hands, such as reference image 502 of FIG. 5A, to adjust the exposure of the withdrawal-responsive image. To do so, the computing device may learn or be provided with data for a desired exposure of the wearer's hand or hands. Such data may indicate a desired contrast, brightness, and/or coloration of the wearer's hand, and may be obtained in various ways. For example, the data for the desired exposure may be determined from a previously captured image in which a wearer's hand is known to be correctly exposed, or which the wearer has indicated to be correctly exposed (or exposed in a manner that the user finds desirable). The portion or portions of the reference image that include the wearer's hands may then be identified, and exposure data from the identified portion or portions may then compared to the data indicating the desired exposure. The computing device may then determine an exposure-adjustment setting or settings to adjust the exposure of the hands in the reference image to better match the desired exposure. The computing device may then use the determined exposure-adjustment settings to adjust the exposure of subsequent withdrawal-responsive image.

D. Targeted Processing of an Image

In a further aspect, some embodiments may implement a white-balancing technique that is biased towards the selection area in the reference image. In other words, such a process may adjust the white balance such that the selection area that the wearer frames is properly exposed and/or white-balanced, even if this means that other parts of the image less properly exposed and/or white-balanced than they could be. Since they parts of the withdrawal-responsive image outside the selection area may ultimately be cropped, such targeted processing may help to improve image quality.

E. Other Techniques for Using the Hands to Process an Image

In some embodiments, a computing device may use the appearance of a wearer's hands in the withdrawal-responsive image itself to determine image-adjustment settings, rather than utilizing a reference image. For instance, as noted above, a computing device may consider a frame formation to be withdrawn before the wearer's hand or hands are pulled out of the field of view of the HMC. Therefore, the computing device may cause a withdrawal-responsive image to be captured after the wearer has pulled their hand or hands away from the frame area defined by the formation, but before the wearer's hand or hands are completely out of the field of view of the HMC. As such, the withdrawal-responsive image that is captured may include at a least a portion of the wearer's hand or hands.

In such an embodiment, the withdrawal-responsive image may ultimately be cropped so as to remove the wearer's hands from the image. However, the portion or portions of the uncropped withdrawal-responsive image that include at least a portion of the wearer's hands may be identified. As such, the uncropped withdrawal-responsive image may be used to determine one or more image-adjustment settings in the same or a similar manner as a reference image was described above as being used to do so.

F. Providing Multiple Processing Options for an Image

In some embodiments, a computing device may process an image in several different ways to create multiple versions of a withdrawal-responsive image. For instance, a computing device may apply different white-balancing adjustments, may apply different exposure adjustments, and/or may crop the withdrawal-responsive image in various ways, to generate a number of versions of the withdrawal-responsive image.

Multiple versions of the withdrawal-responsive image may then be presented to the wearer. For instance, an HMD may display multiple versions of a withdrawal-responsive image that are each processed and/or cropped in a different way. As a specific example, an HMD could display three versions of a withdrawal-responsive image, with each version being cropped differently. For instance, the first version may be uncropped, the second version may be tightly cropped around exactly the selection area, and the third version may be loosely cropped around the selection area (possibly being cropped so that it fits to a 4/3 aspect ratio. Other examples are also possible.

Provided with multiple versions of a withdrawal-responsive image, the wearer may then select one of the versions to store to; e.g., their image library on the HMD or in the cloud. Further, some implementations might allow a wearer to select and store multiple versions of the withdrawal-responsive image.

V. FEEDBACK TO ASSIST THE WEARER IN CAPTURING AN IMAGE

In a further aspect of some embodiments, an HMD may provide various types of feedback to assist a wearer in forming their hands into a frame formation and/or withdrawing their hands to capture an image. For example, various types of audible and/or visual feedback may be provided.

For example, a tone or tones could be played out when a correct position of the hands is detected and/or when certain steps in forming the frame formation are detected. To illustrate, an HMD could play out a first tone when the left hand is detected in a correct position (e.g., a position that is interpreted as being part of a frame formation), and play out a second tone when the left hand is detected in a correct position. Further, both tones may continue to be played out so long as the hands are in the correct position, such that the tones form a chord when the hands are correctly positioning in the frame formation.

As a specific example, an HMD could play out a first tone when the left hand is detected in an "L" shape, such as that of the user's left hand 404b in FIG. 4A. The HMD could then play out a second tone when the HDM detects that the right hand is in an "L" shape and is positioned appropriately with respect to the left hand, such as is shown by the shape and position of the user's right hand 404a in FIG. 4A. Other specific examples are also possible.

Additionally or alternatively, the volume and/or pitch of one or more tones or sounds could be a function of how long the frame formation has been formed. Thus, in embodiments where the wearer must hold the frame formation for a certain period, such tones or sounds may indicate when the wearer withdraw their hands from the frame formation to take a picture. For instance, an "engine powering up" sound could start at a lower pitch and volume, and then saturate at a higher pitch and volume after a predetermined period of time (e.g., a half a second or so) to indicate to the wearer that they can withdraw their hands to take a picture. In another implementation, the HMD could play a chime when the hands have been held in the frame formation for the predetermined period.

Further, visual feedback may be possible. For example, a representation of the selection area may be displayed in the HMD's graphic display, such that the selection area appears to be overlaid on the wearer's view of their environment. Other examples of visual feedback are also possible.

VII. CONCLUSION

While the above embodiments have been described in reference to a wearer positioning, their hand or hands in, and then withdrawing from, a frame formation, an exemplary embodiment may allow capture a photo upon detecting the withdrawal of other hand gestures that can be interpreted to specify a selection area in the wearer's field of view. For example, a computing device could detect when the wearer uses a finger or fingers to draw a circle or another shape within the field of a view of an HMC, and capture an image in response to withdrawal of the finger or fingers from the HMC's field of view. Other examples are also possible.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A computer-implemented method comprising:
receiving, at a computing device, sensor data that is associated with a head-mountable imaging device;
analyzing the sensor data to detect a hand gesture comprising: (a) a placement of the one or more hands in a frame formation, and (b) a subsequent withdrawal of the one or more hands from the frame formation; and
in response to detecting the withdrawal of the one or more hands from the frame formation, causing the head-mountable imaging device to capture a first image.

2. The method of claim 1, wherein the sensor data comprises image data from the head-mountable imaging device.

3. The method of claim 2, where the sensor data comprises low-resolution image data from the head-mountable imaging device, and wherein the first image comprises a high-resolution image.

4. The method of claim 1, further comprising:
in response to detecting the placement of the one or more hands in the frame formation, determining a selection area in a field-of-view of the head-mountable imaging device; and
processing the first image based on the selection area.

5. The method of claim 1, further comprising:
in response to detecting the placement of the one or more hands in the frame formation, determining a frame area in a field-of-view of the head-mountable imaging device;
determining, based on the frame area in the field-of-view of the head-mountable imaging device, a selection area in the first image; and
processing the first image based on the selection area.

6. The method of claim 5, wherein a field-of-view of the head-mountable imaging device corresponds to a field of view of a wearer when the head-mountable imaging device is worn, and wherein the determining the selection area in the captured image comprises:
determining a translation between the field of view of the wearer and the field-of-view of the head-mountable imaging device; and
applying the translation to the frame area in the field of view of the head-mountable imaging device to determine the selection area in the captured image.

7. The method of claim 1, further comprising:
in response to detecting the placement of the one or more hands in the frame formation, capturing a reference image that includes the one or more hands in the frame formation; and
using the reference image to process the first image.

8. The method of claim 7, wherein using the reference image to process the first image comprises:
determining a frame area in a field-of-view of the head-mountable imaging device, wherein the frame area corresponds to a position of the frame formation in the field-of-view of the imaging device;
processing the first image based on the frame area in the field-of-view of the head-mountable imaging device.

9. The method of claim 7, wherein using the reference image to process the first image comprises:
determining a translation between the field of view of the wearer and the field-of-view of the head-mountable imaging device;
determining a frame area in a field-of-view of the head-mountable imaging device, wherein the frame area corresponds to a position of the frame formation in the reference image;
applying the translation to the frame area in the field of view of the head-mountable imaging device to determine a selection area in the captured image; and
processing the captured image based on the selection area.

10. The method of claim 7, wherein using the reference image to process the first comprises:
determining one or more aspects of the reference image that correspond to a position of the frame formation in the reference image
identifying the one or more aspects in the first image;
determining, based on a respective positions of the one or more aspects in the first image, a selection area in the first image; and
processing the first image based on the selection area.

11. The method of claim 7, wherein using the reference image to process the first image comprises:
determining, based on a position of the frame formation, a selection area in the first image;
cropping the first image based on the selection area.

12. The method of claim 11, wherein the first image is cropped to boundaries of the selection area.

13. The method of claim 11, wherein cropping the first image based on the selection area comprises:
determining, based on a position of the frame formation, a selection area in the first image;
determining at least one target aspect of the first image that is substantially within the selection area; and
cropping the first image so as to visually highlight the at least one target aspect of the first image.

14. The method of claim 7, wherein using the reference image to process the first image comprises:
identifying a portion of reference image that includes the one or more hands in the reference image;
determining, based on the portion of reference image that includes the one or more hands, an image-adjustment setting; and
applying the image-adjustment setting to the first image.

15. The method of claim 14, wherein the image-adjustment setting comprises a white balance setting.

16. The method of claim 14, wherein the image-adjustment setting comprises an exposure setting.

17. The method of claim 1, further comprising:
in response to detecting the placement of the one or more hands in the frame formation, determining a frame area in a field-of-view of the head-mountable imaging device, wherein the first image is captured when the one or more hands are outside of the frame area but at least partially within the field-of-view of the head-mountable imaging device such that a portion the first image includes at least a portion of the one or more hands; and
determining, based on the portion of first image that includes the one or more hands, an image-adjustment setting;
applying the image-adjustment setting to the first image.

18. A computing system comprising:
an interface configured to receive sensor data that is associated with a head-mountable imaging device; and
a control system comprising a non-transitory computer-readable medium and program instructions stored on the non-transitory computer-readable medium and executable by at least one processor to:
analyze the sensor data to detect a hand gesture: (a) one or more hands shaped in a frame formation, and (b) a subsequent withdrawal of the one or more hands from the frame formation; and
in response to detecting the withdrawal of one or more hands from the frame formation, causing the head-mountable imaging device to capture a first image.

19. The system of claim 18, wherein the system further comprises program instructions stored on the non-transitory computer-readable medium and executable by at least one processor to:
in response to detecting the placement of the one or more hands in the frame formation, determine a selection area in a field-of-view of the camera; and
process the first image based on the selection area.

20. The system of claim 18, wherein the system further comprises program instructions stored on the non-transitory computer-readable medium and executable by at least one processor to:
in response to detecting the placement of the one or more hands in the frame formation, capture a reference image that includes the one or more hands in the frame formation; and
use the reference image to process the first image.

21. A non-transitory computer readable medium having stored therein instructions that are executable to cause a computing device to perform functions comprising:
- receiving, at a computing device, sensor data that is associated with a head-mountable camera;
- analyzing the sensor data to detect a hand gesture comprising: (a) one or more hands shaped in a frame formation, and (b) a subsequent withdrawal of the one or more hands from the frame formation; and
- in response to detecting the withdrawal of the one or more hands from the frame formation, causing the head-mountable camera to capture a first image.

22. The non-transitory computer readable medium of claim 21, wherein the instructions are further executable to cause the computing device to perform functions comprising:
- in response to detecting the placement of the one or more hands in the frame formation, determining a selection area in a field-of-view of the camera; and
- processing the first image based on the selection area.

23. The non-transitory computer readable medium of claim 21, wherein the instructions are further executable to cause the computing device to perform functions comprising:
- in response to detecting the placement of the one or more hands in the frame formation, capturing a reference image that includes the one or more hands in the frame formation; and
- using the reference image to process the first image.

* * * * *